(12) United States Patent
Choi et al.

(10) Patent No.: US 9,667,811 B2
(45) Date of Patent: *May 30, 2017

(54) MOBILE TERMINAL AND EVENT PROCESSING METHOD

(71) Applicant: Samsung Electronics Co., Ltd., Gyeonggi-do (KR)

(72) Inventors: Kyu-Ok Choi, Seoul (KR); Won-Chul Bang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/932,563

(22) Filed: Nov. 4, 2015

(65) Prior Publication Data

US 2016/0127570 A1   May 5, 2016

Related U.S. Application Data (63) Continuation of application No. 11/777,829, filed on Jul. 13, 2007, now Pat. No. 9,203,950.

(30) Foreign Application Priority Data

Aug. 2, 2006 (KR) .................. 10-2006-0073024

(51) Int. Cl.
*H04M 1/00* (2006.01)
*H04M 19/04* (2006.01)
(Continued)

(52) U.S. Cl.
CPC ....... *H04M 19/047* (2013.01); *H04M 1/0202* (2013.01); *H04M 1/72563* (2013.01); *H04M 1/72569* (2013.01); *H04M 2250/12* (2013.01)

(58) Field of Classification Search
CPC .................. G06F 1/1626; G06F 1/1684; G06F 2200/1614; G06F 1/1616; G06F 1/165;
(Continued)

(56) References Cited

U.S. PATENT DOCUMENTS

| 5,027,384 A | 6/1991 | Morganstein |
| 6,549,792 B1 * | 4/2003 | Cannon ............... H04M 1/0202 340/7.32 |

(Continued)

FOREIGN PATENT DOCUMENTS

| DE | 10 2004 061 169 | 6/2006 |
| EP | 1 578 094 | 9/2005 |

(Continued)

OTHER PUBLICATIONS

European Search Report dated Feb. 27, 2017 issued in counterpart application No. 16194675.1-1879, 9 pages.

*Primary Examiner* — Mahendra Patel
(74) *Attorney, Agent, or Firm* — The Farrell Law Firm, P.C.

(57) ABSTRACT

Provided is a mobile terminal having a sensor detecting movement thereof and an event processing method. The mobile terminal includes: an orientation detector for monitoring, in response to detection of an event, movement of the mobile terminal for a preset time duration to identify an orientation of the mobile terminal; and a controller for processing the event in an operating mode corresponding to the identified orientation. As a result, the user can readily switch operating modes of the mobile terminal by changing orientations thereof.

16 Claims, 7 Drawing Sheets

(51) Int. Cl.
*H04M 1/725* (2006.01)
*H04M 1/02* (2006.01)

(58) Field of Classification Search
CPC ........... H04M 2250/16; H04M 1/0222; H04M 1/0241; H04M 2250/12; H04M 1/72569; H04M 1/72519; H04M 3/436; H04M 19/041; H04M 19/045; H04M 1/0202; H04M 1/72563; H04M 19/047; H04B 7/18567
USPC .... 455/567, 418, 420, 428, 426.1, 417, 509; 370/321; 380/249
See application file for complete search history.

(56) References Cited

U.S. PATENT DOCUMENTS

| | | | |
|---|---|---|---|
| 6,912,386 B1 * | 6/2005 | Himberg | H04M 1/72569 455/418 |
| 7,302,280 B2 | 11/2007 | Hinckley et al. | |
| 7,522,065 B2 | 4/2009 | Falcon | |
| 2002/0193080 A1 * | 12/2002 | Komsi | G06F 3/0233 455/575.1 |
| 2003/0045274 A1 | 3/2003 | Nishitani | |
| 2004/0259536 A1 * | 12/2004 | Keskar | H04M 1/72569 455/418 |
| 2005/0030179 A1 * | 2/2005 | Script | G08B 13/08 340/545.1 |
| 2005/0059435 A1 | 3/2005 | McKee et al. | |
| 2005/0064913 A1 | 3/2005 | Kim | |
| 2005/0096026 A1 | 5/2005 | Chitrapu et al. | |
| 2006/0022950 A1 * | 2/2006 | Friedrichs | G06F 1/1616 345/169 |
| 2006/0052109 A1 | 3/2006 | Ashman et al. | |
| 2006/0063569 A1 * | 3/2006 | Jacobs | G06F 1/1624 455/575.1 |
| 2006/0111093 A1 | 5/2006 | Shim et al. | |
| 2006/0128368 A1 * | 6/2006 | Kim | H04M 1/72566 455/418 |
| 2006/0161871 A1 | 7/2006 | Hotelling et al. | |

FOREIGN PATENT DOCUMENTS

| | | | |
|---|---|---|---|
| KR | 1020050004535 | 1/2005 | |
| KR | 100700142 B1 * | 3/2007 | ............... H04B 1/40 |
| WO | WO 2004/082248 | 9/2004 | |
| WO | WO 2006/057770 | 6/2006 | |
| WO | WO 2006/063671 | 6/2006 | |

\* cited by examiner

MOBILE TERMINAL AND EVENT PROCESSING METHOD

PRIORITY

This application is a continuation of, and claims priority under U.S.C. §120 to, U.S. application Ser. No. 11/777,829, filed on Jul. 13, 2007, issued on Dec. 1, 2015 as U.S. Pat. No. 9,203,950, and claims priority under 35 U.S.C. §119 to an application entitled "Mobile Terminal And Event Processing Method" filed in the Korean Intellectual Property Office on Aug. 2, 2006 and assigned Serial No. 2006-0073024, the contents of all of which are incorporated herein by reference.

BACKGROUND OF THE INVENTION

1. Field of the Invention

The present invention relates generally to a mobile terminal and, in particular, to a mobile terminal and an event processing method for the mobile terminal, wherein operating modes of the mobile terminal are switched according to identified orientations of the mobile terminal.

2. Description of the Related Art

Mobile terminals such as cellular phones and Personal Digital Assistants (PDA) provide various functions that can be set by users and selected for execution. Manufacturers of mobile terminals and mobile service providers continuously develop and provide functions and services related to, for example, a camera, a Bluetooth® device, a wireless local area network, radio, games, calculator, calendar, clock, ring tone, text messages, image messages, on-line games, wireless Internet access, and caller identification.

A user is generally advised to avoid making noise caused by the use of a mobile terminal having such various functions in public places or some situations (e.g., meeting room, school class, museum, library, cinema, and gathering).

Figure 1:
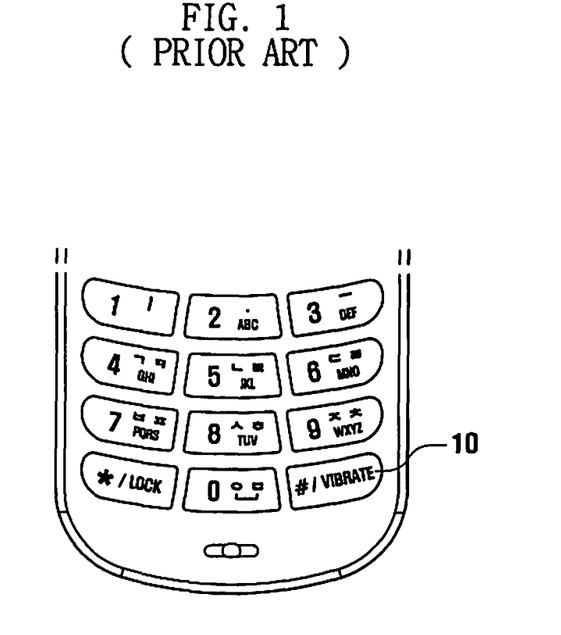
FIG. 1 illustrates a key of a keypad for setting a 'vibrate' mode in a conventional mobile terminal.

Thereto, the user may set a 'vibrate' mode by pressing a particular key assigned as a shortcut key for a 'manner' mode as illustrated in FIG. 1. If the vibrate mode is insufficiently quiet or inappropriate for use, the user may have to turn off the mobile terminal or set a 'silent' mode through a series of steps. When the user has little time available, it is easier for the user to turn off the mobile terminal rather than to set the silent mode. However, if the user turns off the mobile terminal, the user may fail to recognize events such as incoming calls or messages occurring after turning off the mobile terminal.

SUMMARY OF THE INVENTION

The present invention has been made in view of the above problems, and an object of the present invention is to provide a mobile terminal and an event processing method for the same wherein events are processed according to orientations of the mobile terminal.

In accordance with the present invention, there is provided a mobile terminal including an orientation detector for monitoring, in response to detection of an event, movement of the mobile terminal for a preset time duration to identify an orientation of the mobile terminal; and a controller for processing the event in an operating mode corresponding to the identified orientation.

In accordance with the present invention, there is provided an event processing method for a mobile terminal having a sensor for measuring acceleration, including identifying, in response to detection of an event, an orientation of the mobile terminal; and processing the event in an operating mode corresponding to the identified orientation.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF EMBODIMENTS OF THE PRESENT INVENTION

Hereinafter, embodiments of the present invention are described in detail with reference to the accompanying drawings. The same reference symbols identify one of the same and corresponding elements in the drawings. Some constructions or processes known in the art may be not described herein to avoid obscuring the invention in unnecessary detail.

In the present invention, the term 'event' denotes an event accompanied by an alert or sound, such as one of an incoming call, incoming message, wake up alarm, and schedule reminder alarm.

The term 'silent mode' denotes an operating mode in which events are notified using at least one of vibration and an alert lamp. In the description, the alert lamp is mainly utilized in the silent mode.

For event processing in the silent mode, the 'first orientation' of a mobile terminal denotes an orientation of the mobile terminal that remains constant for a preset time period during an initial setting operation.

Figure 2:
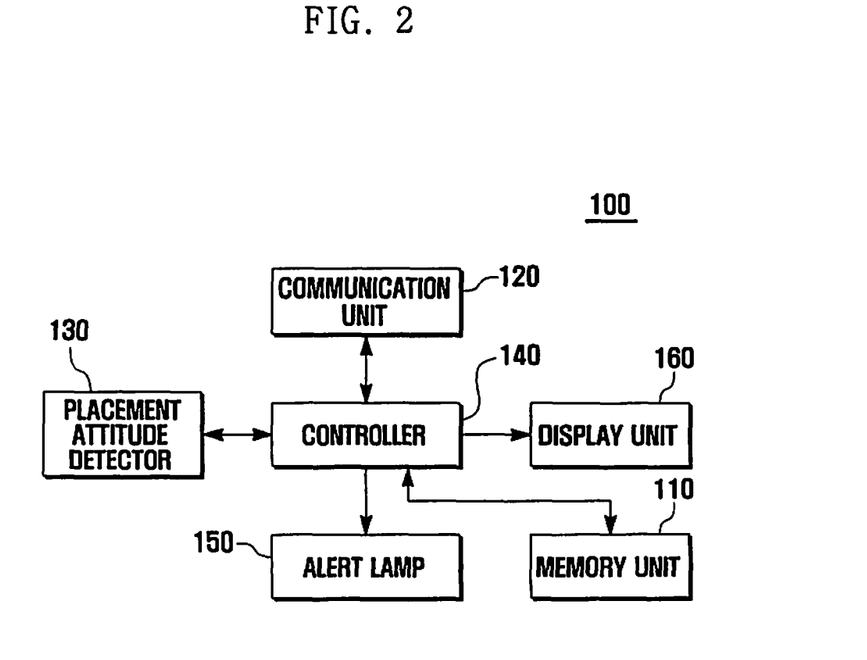
FIG. 2 illustrates a configuration of a mobile terminal according to the present invention.

FIG. 2 illustrates a configuration of a mobile terminal according to the present invention.

Referring to FIG. 2, the mobile terminal 100 includes a memory unit 110, a communication unit 120, an orientation detector 130, a controller 140, an alert lamp 150, and a display unit 160.

The memory unit 110 includes a program memory section for storing executable programs for operating the mobile terminal 100, and a data memory section for storing various data. The memory unit 110 can include a volatile memory device and a non-volatile memory device. In particular, the memory unit 110 stores the first orientation of the mobile terminal 100 for event processing in a silent mode according to user's selection. The first orientation can be pre-stored in the manufacturing process, and be changed by the user. Setting of the first orientation is described herein in relation to FIG. 6. As examples of orientations, the mobile terminal 100 may be placed in a state where the back of the mobile terminal 100 faces downwards, in a state where the front of the mobile terminal 100 faces downwards, or in a state where a side of the mobile terminal 100 faces downwards.

The communication unit 120 transmits and receives voice data and control data to and from a corresponding base station through wireless communication. The communication unit 120 receives an incoming call from a calling mobile terminal through an antenna and transmits the received call to the controller 140, and transmits user-edited data through the antenna to a called mobile terminal. Specifically, the communication unit 120 receives an incoming call event and incoming message event.

Figure 3:
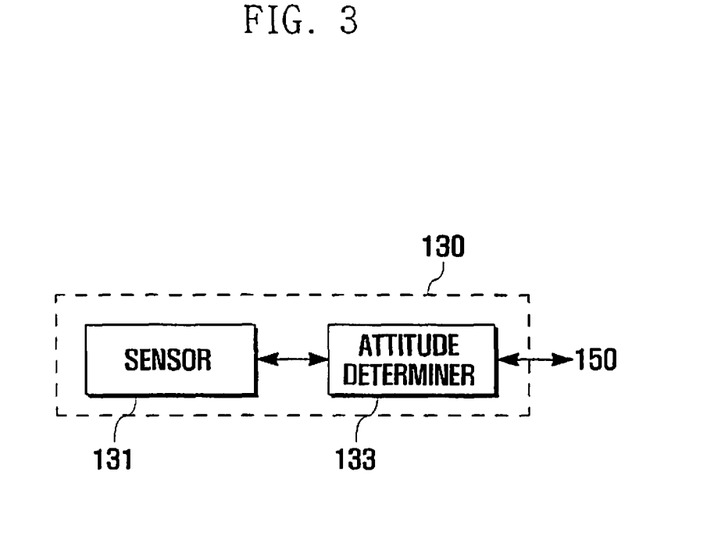
FIG. 3 illustrates a configuration of an orientation detector of the mobile terminal of FIG. 2.

The orientation detector 130 identifies a current orientation of the mobile terminal 100 in response to detection of an event. As illustrated in FIG. 3, the orientation detector 130 includes a sensor 131 for measuring acceleration of the mobile terminal 100, and an attitude determiner 133 for determining the current orientation of the mobile terminal 100 using the measured acceleration. The orientation detector 130 is described hereinbelow.

Figure 9:
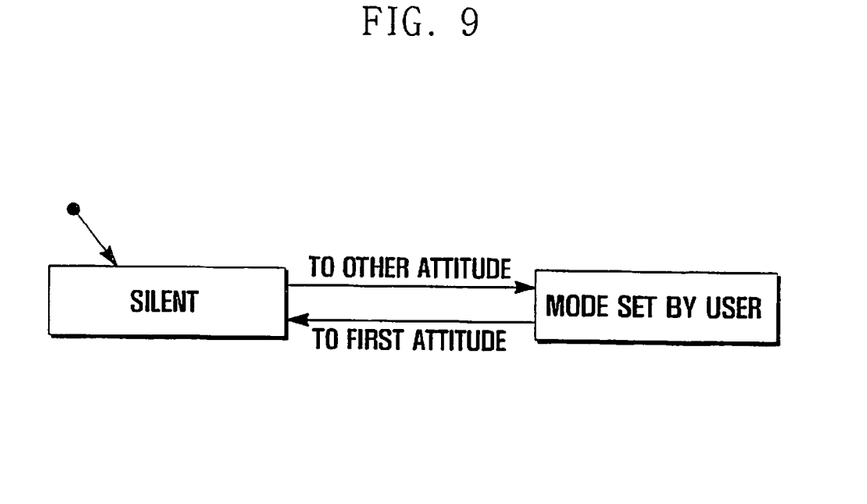
FIG. 9 is a diagram illustrating transitions between operating modes in the method of FIG. 5.

The controller 140 controls overall operation and states of the mobile terminal 100, and can include, for example, a microprocessor and a Digital Signal Processor (DSP). In particular, the controller 140 performs event processing operations in a silent mode or in a mode set by the user, as illustrated in FIG. 9, which illustrates transitions between operating modes, according to an identified orientation and the first orientation.

If the orientation identified by the orientation detector 130 is equal to the first orientation and remains constant for a preset time duration (preferably, about 1 second), the controller 140 sets a silent mode and controls an event processing operation in the silent mode. For example, when an incoming message event or alarm event occurs, if the first orientation is an orientation allowing event display, the controller 140 preferably controls the display unit 160 for displaying corresponding contents as a pop-up window. If the first orientation is an orientation precluding event display, the controller 140 preferably shuts off the power to the display unit 160.

When an incoming call event occurs, the controller 140 processes the event in a no-answer state and controls the communication unit 120 to transmit an automatic response message to a calling mobile terminal.

During event processing, the controller 140 also controls the alert lamp 150 to output lamplight.

Alternatively, if the orientation identified by the orientation detector 130 is not equal to the first orientation or does not remain constant for the preset time duration, the controller 140 controls an event processing operation according to an operating mode set by the user. For example, after an occurrence of an event, if the identified orientation is not equal to the first orientation due to movement of the user, and if the user has set a ring mode, the controller 140 processes the event in the ring mode and controls output of an audio signal corresponding to the event. Preferably, the mobile terminal 100 preferably further includes an audio processor for audio signal processing.

Referring to operating mode transitions in FIG. 9, in response to occurrence of an event, the controller 140 identifies the orientation of the mobile terminal 100. If the mobile terminal 100 is identified to be in the first orientation, the controller 140 sets the silent mode and controls a corresponding event processing operation in the silent mode. During the silent mode, if the orientation of the mobile terminal 100 is changed by the user to another orientation, the controller 140 processes the event according to an operating mode preset by the user. For example, in response to a call event during the silent mode, if the user changes the orientation of the mobile terminal 100 to an orientation other than the first orientation, and if the user has set a ring mode, the controller 140 processes the call event in the ring mode. That is, the controller 140 controls output of an audio signal corresponding to the call event. This may apply to the case where the user moves and carries a bag in which the mobile terminal 100 is placed in the first orientation, because it is desirable not to change the operating mode of the mobile terminal 100 to the silent mode, but to maintain the operating mode set by the user.

For another example, during the mode set by the user, if no signal is input by the user to answer a received call event, the controller 140 enters the call event in a list of unanswered calls. If a message event is received, the controller 140 controls display of the contents of the message event.

Further, during the mode set by the user, if the orientation of the mobile terminal 100 is changed by the user to the first orientation, the controller 140 performs an event processing operation in the silent mode.

The alert lamp 150 outputs lamplight in response to an event occurrence under the control of the controller 140. For example, when an incoming message event is detected in the silent mode, the alert lamp 150 outputs lamplight under control of the controller 140 to inform the user of the incoming message event.

The display unit 160 displays operation states of the mobile terminal 100. In particular, in response to input of an event, the display unit 160 displays corresponding contents of the event under the control of the controller 140. The display unit 160 also displays a message that requests the user to determine whether to end the silent mode, for example, in a pop-up window under the control of the controller 140. Preferably, if the first orientation is an attitude allowing event display (for example, a state in which the mobile terminal 100 is placed so that the back thereof faces downwards), the display unit 160 displays information on the event. Further, the controller 140 preferably shuts off the power to the display unit 160 during the silent mode for reduction of power consumption.

FIG. 3 illustrates a configuration of the orientation detector 130 of the mobile terminal 100.

Referring to FIGS. 2 and 3, the sensor 131 produces an electrical signal corresponding to movement of the mobile terminal 100. In particular, after an event is received by the communication unit 120, the controller 140 permits supply of power to the sensor 131 for detecting movement of the mobile terminal 100. Because continuous monitoring of movement of the mobile terminal 100 using the sensor 131 may consume too much power and interrupt other functions, operation of the sensor 131 is desirable only after collection of an event.

Figure 4:
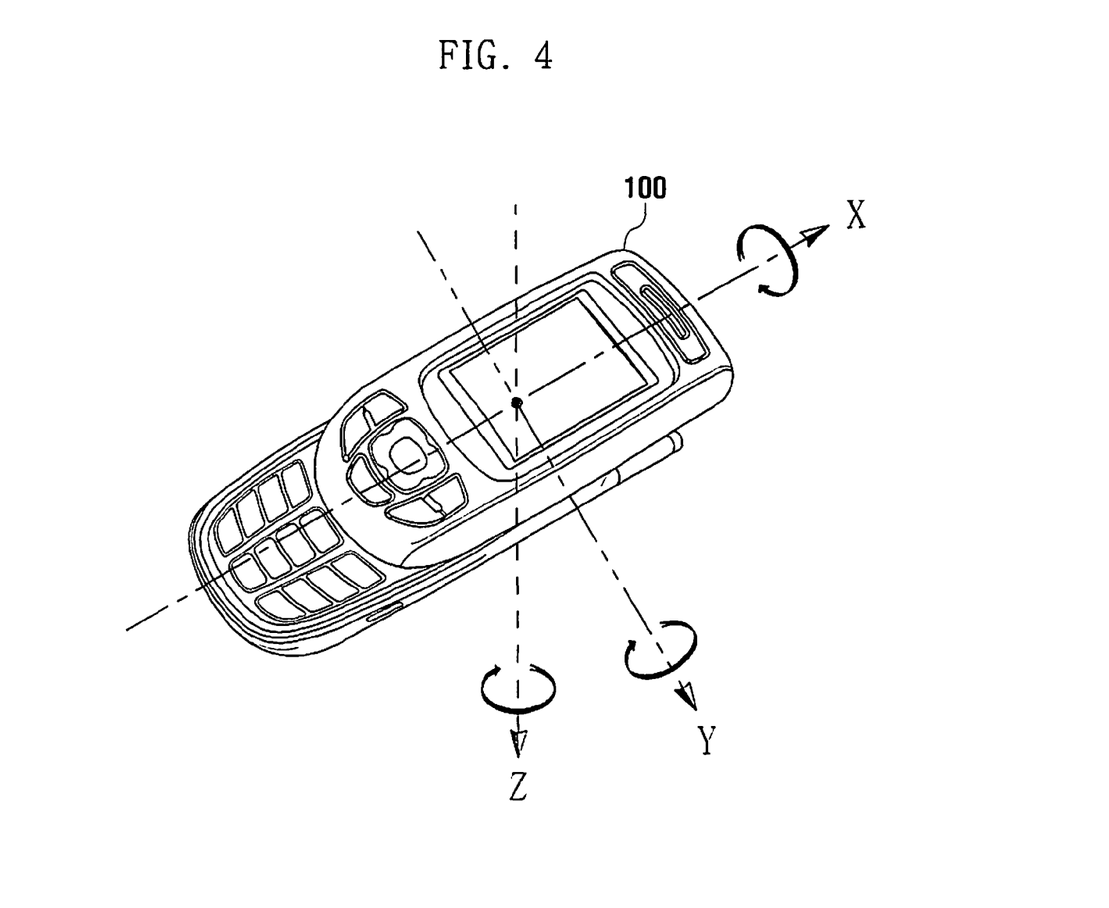
FIG. 4 illustrates rotation angles for calculation of orientations of the mobile terminal of FIG. 2.

Preferably, the sensor 131 is an acceleration sensor that measures acceleration of the mobile terminal 100 and outputs an electrical signal corresponding to the measured acceleration to the attitude determiner 133. In the case where the sensor 131 is a three-axis acceleration sensor, the sensor 131 measures accelerations in X-, Y- and Z-axis directions, as shown in FIG. 4. The sensor 131 measures acceleration equal to the sum of acceleration due to movement of the mobile terminal 100 and acceleration due to gravity, and measures only the acceleration of gravity when the mobile terminal 100 is not in motion.

Figure 10A:
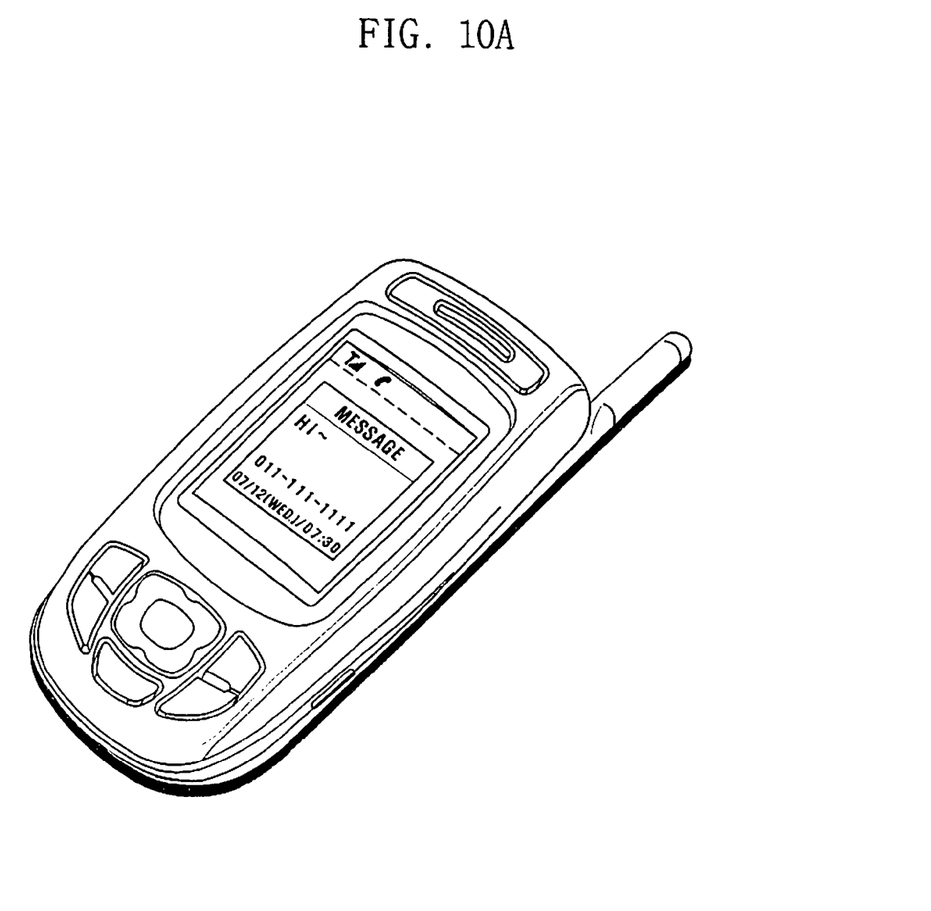
FIGS. 10A and 10B illustrate orientations of the mobile terminal of FIG. 2.
Figure 10B:
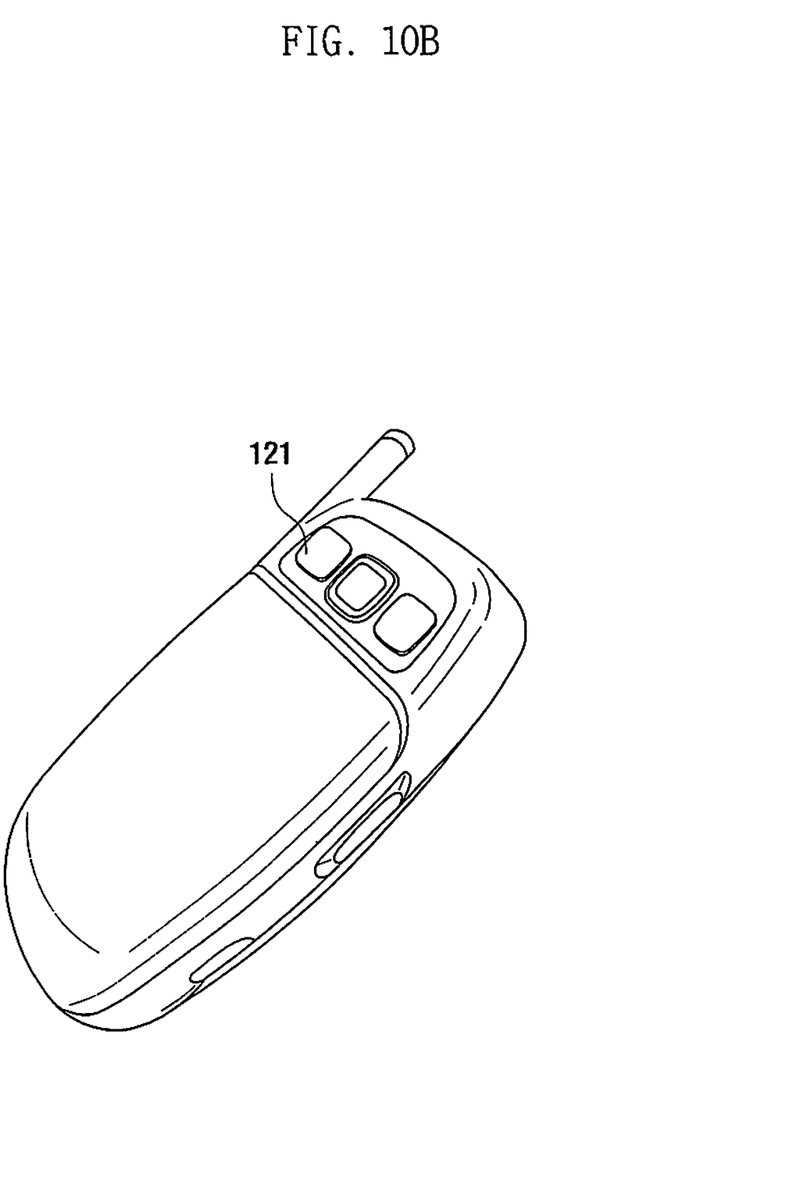

Hereinafter, when associating a placement direction of the mobile terminal 100 with the direction of the gravitational acceleration, a positive value of the gravitational acceleration indicates that the mobile terminal 100 is placed so that the back thereof faces the earth, and a negative value indicates that the mobile terminal 100 is placed so that the front thereof faces the earth. For example, when the mobile terminal 100 is placed on a horizontal surface so that the back thereof faces the earth as shown in FIG. 10A, the sensor 131 would measure X- and Y-axis accelerations of 0 m/sec² and a Z-axis acceleration of 9.8 m/sec². When the mobile terminal 100 is placed on a horizontal surface so that the front thereof faces the earth as shown in FIG. 10B, the sensor 131 would measure X- and Y-axis accelerations of 0 m/sec² and a Z-axis acceleration of −9.8 m/sec².

When the mobile terminal 100 is placed in a position in which the front or back of the terminal is not parallel with the surface of the earth, at least one of the X-, Y- and Z-axis accelerations would be non-zero and the square root of the sum of squares of the X-, Y- and Z-axis accelerations (magnitude of the sum of component vectors) would be equal to 9.8 m/sec².

The sensor 131 measures the X-, Y- and Z-axis accelerations of the mobile terminal 100 in a fixed coordinate system. If an acceleration measured by the sensor 131 is denoted by a, a can be represented by Equation (1):

$$a=[a_x a_y a_z]^T \quad (1)$$

where $a_x$, $a_y$, and $a_z$ are acceleration values along the X-, Y- and Z-axes, respectively, and T is the transpose of a matrix.

The X-, Y- and Z-axes and their corresponding accelerations may change according to a location of the mobile terminal 100 at which the sensor 131 is attached.

The attitude determiner 133 computes the current orientation of the mobile terminal 100 using acceleration values along the X-, Y- and Z-axes measured by the sensor 131. An orientation can be represented by a roll angle Φ, pitch angle Θ, and yaw angle Ψ, wherein, referring to FIG. 4, the roll, pitch and yaw angles are angles of rotation around the X-, Y- and Z-axes, respectively.

The attitude determiner 133 computes the current orientation of the mobile terminal 100 using the following Equation (2) and Equation (3) in terms of measured acceleration values.

$$\phi = a\tan 2(-a_y, -a_z) \quad (2)$$

where a tan 2(m, n) is a two parameter version of the arctangent of m/n.

$$\theta = a\tan 2(a_x, \sqrt{a_y^2 + a_z^2}) \quad (3)$$

For example, referring to FIG. 4, if measured acceleration values along the X-, Y- and Z-axes are zero, zero and 9.8 m/sec², respectively, the attitude determiner 133 computes corresponding roll and pitch angles of zero using Expression 2 and Expression 3. Hence, the attitude determiner 133 can determine the orientation that the mobile terminal 100 is placed on a horizontal surface so that the back thereof faces the earth. The attitude determiner 133 can determine any orientation of the mobile terminal 100 using the above expressions.

Figure 5:
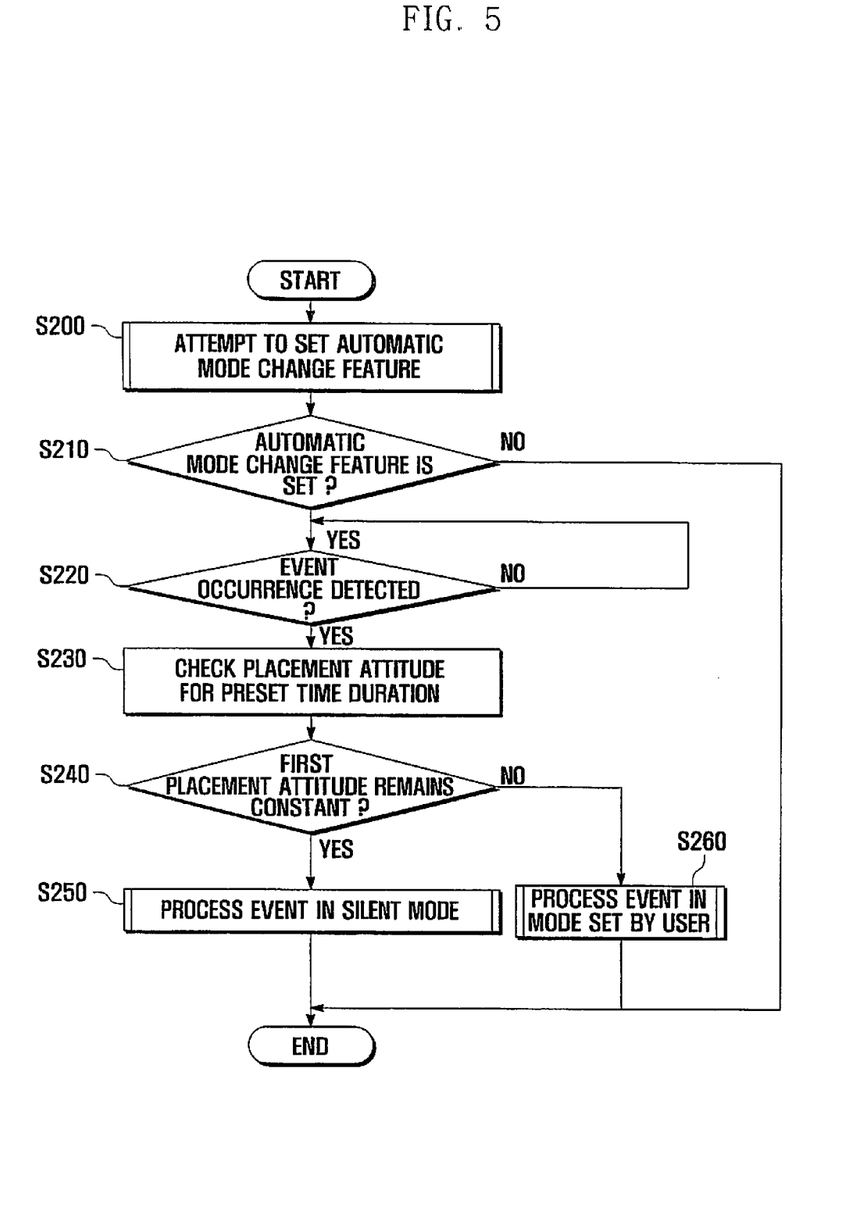
FIG. 5 is a flow chart illustrating an event processing method for the mobile terminal of FIG. 2 according to the present invention.

FIG. 5 is a flow chart illustrating steps of an event processing method for the mobile terminal of FIG. 2 according to the present invention. Referring to FIGS. 2 and 5, the method is described as follows.

In step S200, the controller 140 attempts to set an automatic mode change feature for event processing in a silent mode. Step S200 does not have to be performed if the automatic mode change feature is preset by default, and is described later in relation to FIG. 6. In step S210, the controller 140 determines whether the automatic mode change feature is set successfully. If the automatic mode change feature is set, in step S220, the controller 140 determines whether an occurrence of an event is detected. If an occurrence of an event is detected, the controller 140 controls the orientation detector 130 to check the orientation of the mobile terminal 100 for a preset time duration of, preferably, about 1 second in step S230. Orientation determination has been described above in relation to the orientation detector 130 in FIG. 3.

Thereafter, in step S240, the controller 140 determines whether the checked orientation is equal to the first orientation and remains constant for the preset time duration. If the orientation remains constantly equal to the first orientation, the controller 140 processes the occurred event in the silent mode in step S250. Step S250 is described herein in relation to FIGS. 8A and 8B.

If the orientation does not remain constantly equal to the first orientation, the controller 140 processes the occurred event in a mode set by the user in step S260.

Figure 6:
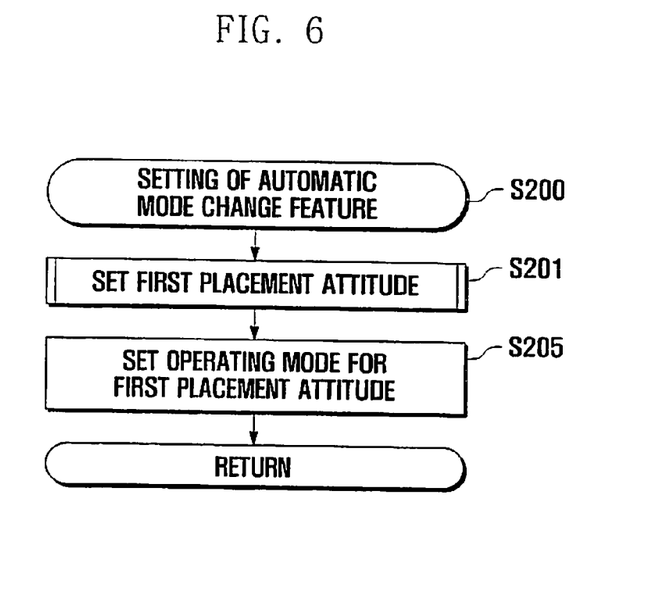
FIG. 6 is a flow chart illustrating an automatic mode change setting step in the method of FIG. 5.

FIG. 6 is a flow chart illustrating the automatic mode change feature setting step S200 in the method of FIG. 5.

Referring to FIGS. 2 and 6, in step S201, the controller 140 sets the first orientation to the current orientation of the mobile terminal 100. Step 201 is described in relation to FIG. 7. The controller 140 sets an operating mode suitable for the first orientation, preferably the silent mode, according to user selection in step S205.

Figure 7:
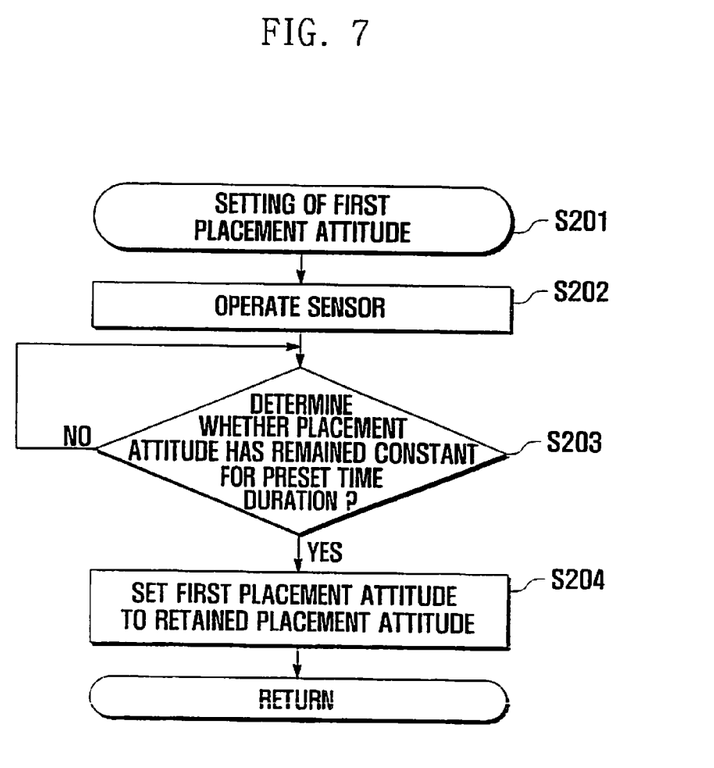
FIG. 7 is a flow chart illustrating an attitude setting step in the flow chart of FIG. 6.

FIG. 7 is a flow chart illustrating the attitude setting step S201 in FIG. 6.

Referring to FIGS. 2 and 6, in step S202, the controller 140 operates the sensor 131 and determines whether the particular orientation of the mobile terminal 100 has remained constant for a preset time duration of, preferably, about 1 second in step S203. If the orientation has not remained constant for the preset time duration, step S203 is repeated for a preset time duration. If the orientation has remained constant for the preset time duration, the controller 140 sets the first orientation to the retained orientation and stores the retained orientation in the memory unit 110 in step S204.

Figure 8A:
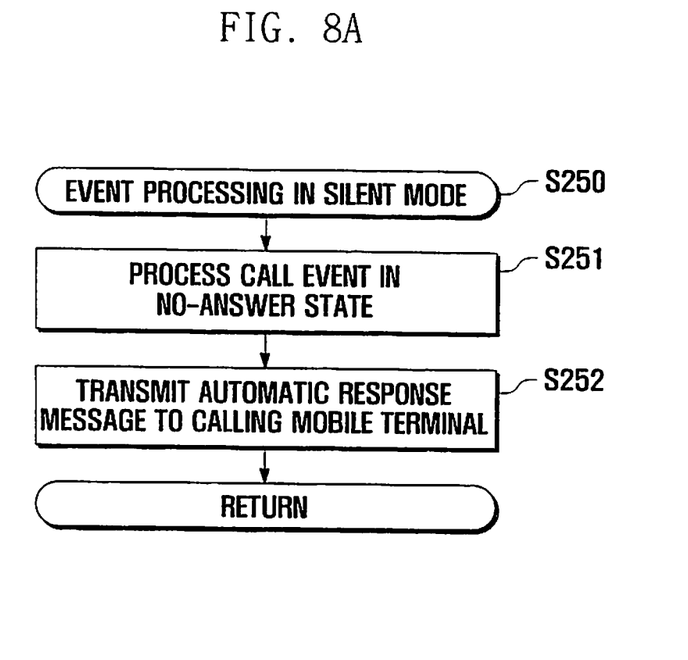
FIGS. 8A and 8B illustrate an event processing step in a silent mode of the method in FIG. 5.
Figure 8B:
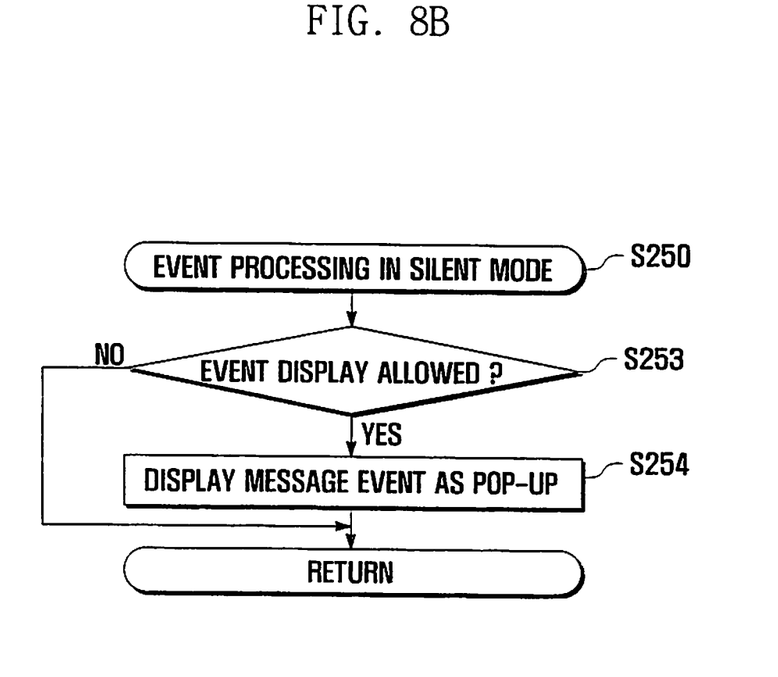

FIGS. 8A and 8B illustrate the step of event processing in the silent mode of the method in FIG. 5. FIG. 8A is a flow chart illustrating processing an incoming call event in the silent mode; and FIG. 8B is a flow chart for processing one of an incoming message event and an alarm event in the silent mode.

Referring to FIGS. 2 and 8A, in response to a call event received through the communication unit 120, the controller 140 processes the call event in a no-answer state in step S251. If the first orientation allows event display, information regarding the received event is displayed on the display unit 160. Preferably, an orientation allowing event display refers to a state in which the mobile terminal 100 is placed so that the back thereof faces the earth. If the first orientation does not allow event display, the information on the received event is not displayed and the controller 140 preferably shuts off the power to the display unit 160 for reduction of power consumption.

The controller 140 analyzes the received event, transmits an automatic response message through the communication unit 120 to a calling mobile terminal, and stores the analysis result in the memory unit 110 in step S252.

Referring to FIGS. 2 and 8B, in step S253, in response to reception of a message event, the controller 140 determines whether the first orientation allows event display. In step S254 if the first orientation allows event display, the controller 140 controls the display unit 160 to display the message event on a pop-up window, and stores the message event in the memory unit 110. Preferably, an orientation allowing event display refers to a state in which the mobile terminal 100 is placed so that the back thereof faces the earth. If the first orientation does not allow event display, the received event is not displayed, and the controller 140 preferably shuts off the power to the display unit 160 for reduction of power consumption.

In the description, an acceleration sensor is used to identify the orientation of the mobile terminal 100. A sensor other than the acceleration sensor, such as an optical sensor that measures the intensity of light, can also be used to identify the orientation of the mobile terminal 100.

As apparent from the above description, the present invention provides a mobile terminal and event processing method for the same, wherein operating modes are switched according to identified orientations of the mobile terminal. In particular, events are processed according to the current orientation of the mobile terminal. For example, in public places where making a noise due to the use of a mobile terminal is discouraged, the user can switch the operating mode from a ring mode to a silent mode by simply changing the orientation of the mobile terminal. Hence, events such as an incoming call, incoming text message and alarm, can be processed without ringing.

While preferred embodiments of the present invention have been shown and described in this specification, it will be understood by those skilled in the art that various changes or modifications of the embodiments are possible without departing from the spirit and scope of the invention as defined by the appended claims.

What is claimed is:

1. An apparatus comprising:
a speaker;
a sensor;
a housing including a first surface and a second surface; and
a controller,
wherein the controller:
outputs, via the speaker, an audible sound in response to an incoming call;
detects, via the sensor, a movement of the apparatus while the audible sound in response to the incoming call is outputted, wherein, as part of the detecting, the controller identifies a rotation of the apparatus from a first orientation to a second orientation; and
adjusts a degree of the audible sound in response to the incoming call based on detecting the movement,
wherein the first surface of the housing faces upward in the first orientation, and the first surface of the housing faces downward in the second orientation.

2. The apparatus of claim 1, wherein the second orientation is set by a manufacturer of the apparatus.

3. The apparatus of claim 1, wherein the controller, as part of the adjusting, mutes the audible sound based on the identifying of the rotation.

4. The apparatus of claim 1, wherein the controller performs the adjusting further based on a determination that the apparatus remains stationary for a specified period of time after the movement.

5. The apparatus of claim 1, wherein the controller performs the adjusting based on a determination that the apparatus is in a first mode.

6. The apparatus of claim 1, further comprising an acceleration sensor or an optical sensor to detect the movement.

7. The apparatus of claim 6, wherein the controller activates a corresponding one of the acceleration sensor and the optical sensor based on the occurrence of the incoming call.

8. The apparatus of claim 1, wherein, if another movement of the apparatus is detected after the adjusting, the controller resumes the outputting of the audible sound part on the detecting of the other movement.

9. The apparatus of claim 1, wherein the controller, as part of the adjusting, presents a notification corresponding to the incoming call using a light or a vibration.

10. The apparatus of claim 1, wherein the controller turns off a display disposed in one of the first and second surfaces of the housing as part of the adjusting.

11. The apparatus of claim 1, wherein the controller transmits, as part of the adjusting, an automatic response message to an electronic device corresponding to the incoming call using the communication interface.

12. A method comprising:
outputting, at an electronic device including a speaker, a sensor, and a processor, an audible sound in response to an incoming call via the speaker;
detecting, by the processor using the sensor, a movement of the electronic device while the audible sound in response to the incoming call is outputted, wherein the detecting comprises:
identifying a rotation of the electronic device from a first orientation to a second orientation; and
adjusting a degree of the audible sound in response to the incoming call based on detecting the movement,
wherein a first surface of a housing of the electronic device faces upward in the first orientation, and the first surface of the housing faces downward in the second orientation.

13. The method of claim 12, wherein the adjusting comprises:
muting the audible sound based on the identifying of the rotation.

14. The method of claim 12, wherein the adjusting is also based on a determination that the electronic device is in a first mode.

15. A mobile terminal comprising:
a housing comprising a front side and a back side;
at least one processor electrically coupled to a communication device, the at least one processor being capable of switching the mobile terminal between a ring mode, a vibration mode, and a silent mode in response to an input via a user interface, wherein,
in the ring mode, a sound is generated by the mobile terminal in response to an incoming call,
in the vibration mode, vibration is generated by the mobile terminal in response to an incoming call, and
in the silent mode, neither sound nor vibration is generated in response to an incoming call; and
a sensor electrically coupled to the at least one processor, wherein the at least one processor determines, using the sensor, whether the back side of the housing faces downward or the front side of the housing faces downward in response to an incoming call for a selected period, wherein the at least one processor keeps the mobile terminal in the silent mode if the front side of the housing faces downward for the selected period, and wherein the at least one processor keeps the mobile terminal in the ring mode or the vibration mode if the back side of the housing faces downward for the selected period.

16. The mobile terminal of claim 15, wherein the mobile terminal changes from the ring mode or the vibration mode to the silent mode if the orientation of the housing is changed such that the front side of the terminal faces downward.

* * * * *